(12) United States Patent
Zaghetto et al.

(10) Patent No.: US 11,368,693 B2
(45) Date of Patent: Jun. 21, 2022

(54) FORWARD AND INVERSE QUANTIZATION FOR POINT CLOUD COMPRESSION USING LOOK-UP TABLES

(71) Applicant: SONY CORPORATION, Tokyo (JP)

(72) Inventors: Alexandre Zaghetto, San Jose, CA (US); Danillo Graziosi, San Jose, CA (US); Ali Tabatabai, Cupertino, CA (US)

(73) Assignee: Sony Group Corporation, Tokyo (JP)

( * ) Notice: Subject to any disclaimer, the term of this patent is extended or adjusted under 35 U.S.C. 154(b) by 1 day.

(21) Appl. No.: 16/812,117

(22) Filed: Mar. 6, 2020

(65) Prior Publication Data

US 2021/0006791 A1    Jan. 7, 2021

Related U.S. Application Data

(60) Provisional application No. 62/869,129, filed on Jul. 1, 2019.

(51) Int. Cl.
*H04N 11/02* (2006.01)
*H04N 19/124* (2014.01)
*G06T 9/40* (2006.01)
*H04N 19/44* (2014.01)

(52) U.S. Cl.
CPC .......... *H04N 19/124* (2014.11); *G06T 9/40* (2013.01); *H04N 19/45* (2014.11)

(58) Field of Classification Search
CPC ......... H04N 19/124; H04N 19/45; G06T 9/40

USPC ................. 375/240.03, 240.12; 382/100
See application file for complete search history.

(56) References Cited

U.S. PATENT DOCUMENTS

| 10,085,024 B2 | 9/2018 | Yu et al. | |
| 2011/0051803 A1* | 3/2011 | Dencher | H04N 19/103 375/240.03 |
| 2015/0043641 A1* | 2/2015 | Gamei | H04N 19/117 375/240.12 |
| 2015/0193899 A1* | 7/2015 | Oztaskent | G06Q 30/02 382/100 |
| 2019/0110054 A1* | 4/2019 | Su | H04N 19/154 |

OTHER PUBLICATIONS

"G-PCC codec description ", 128. Mpeg Meeting: Oct. 7, 2019-Oct. 11, 2019; Geneva; (Motion Picture Expert Group or ISO/I EC JTC1/SC29/WG11), No. n18891 Dec. 18, 2019 (Dec. 18, 2019), XP030225589, Retrieved from the Internet: URL:http://phenix.int-evry.fr/mpeg/doc_end_user/documents/128 Geneva/wg11/w18891.zip w18891.docx [retrieved on Dec. 18, 2019] section "3.10 Attribute Quantization".

(Continued)

*Primary Examiner* — Jayanti K Patel
*Assistant Examiner* — Richard B Carter
(74) *Attorney, Agent, or Firm* — Haverstock & Owens, A Law Corporation

(57) ABSTRACT

A quantization scheme substitutes the division operation by forward and inverse quantization look-up tables to improve efficiency.

14 Claims, 3 Drawing Sheets

(56) References Cited

OTHER PUBLICATIONS

"Alexandre Zaghetto (Sony) et al : [G-PCC] (New) Lifting and RAHT harmonization", 127. MPEG Meeting; Jul. 8, 2019-Jul. 12, 2019; Gothenburg; (Motion Picture Expert Group or ISO/I EC JTC1/SC29/WG11). No. m48918 Jul. 3, 2019 (Jul. 3, 2019), XP030206929, Retrieved from the internet: URL:http://phenix.int-evry.fr/mpeg/doc_end_user/documents/127Gothenburg/wg11/m48918-vl-m48918_NEW LiftingandRAHTharmonization .zip m48918v4.docx [retrieved on Jul. 3, 2019] the whole document.

Luhang Xu (Fujitsu) et al : "Non-CE10: A CNN based in-loop filter for intra frame", 15. JVET Meeting; Jul. 3, 2019-Jul. 12, 2019; Gothenburg; (The Joint Video Exploration Team of ISO/IEC JTC1/SC29/WG11 and ITU-TSG.16), No. JVET-O0157 June. 24, 2019 (June. 24, 2019), XP030218727, Retrieved from the Internet: URL:http://phenix.int-evry.fr/jvet/doc_end_user/documents/15_Gothenburg/wg11/JVET-O0 157-vl. zip JVET-O0157 /JVET-O0157. docx [retrieved on Jun. 24, 2019] the whole document.

Noritaka Iguchi (Panasonic) et al: "[G-PCC] Quantization Parameter table in Attribute Coding", 126. MPEG Meeting; Mar. 25, 2019-Mar. 29, 2019; Geneva; (Motion Picture Expert Group or ISO/I EC JTC1/SC29/WG11), No. m47401 Mar. 21, 2019 (Mar. 21, 2019). XP030211398, Retrieved from the internet: URL:http://phenix.int-evry.fr/mpeg/doc_end_user/documents/126_Geneva/wg11/m47401-v2-m47401_QPTable.zip m47401_QPTable/m47401_QPtable r2.docx [retrieved on Mar. 21, 2019] the whole document.

Ali Tabatabai (Sony) et al:"[G-PCC] New contribution on quantization parameter definition", 126. MPEG Meeting; Mar. 25, 2019-Mar. 29, 2019; Geneva: (Motion Picture Expert Group or ISO/IECJTC1/SC29/WG11), , No. m47507 Mar. 20, 2019 (Mar. 20, 2019), XP030211556, Retrieved from the Internet: URL:http://phenix.int-evry.fr/mpeg/doc_end user/documents/126 Geneva/wgll/m47507-vl-m47507.zip m47507.docx [retrieved on Mar. 20, 2019] the whole document.

\* cited by examiner

FORWARD AND INVERSE QUANTIZATION FOR POINT CLOUD COMPRESSION USING LOOK-UP TABLES

CROSS-REFERENCE TO RELATED APPLICATION(S)

This application claims priority under 35 U.S.C. § 119(e) of the U.S. Provisional Patent Application Ser. No. 62/869,129, filed Jul. 1, 2019 and titled, "FORWARD AND INVERSE QUANTIZATION FOR POINT CLOUD COMPRESSION USING LOOK-UP TABLES," which is hereby incorporated by reference in its entirety for all purposes.

FIELD OF THE INVENTION

The present invention relates to three dimensional graphics. More specifically, the present invention relates to coding of three dimensional graphics.

BACKGROUND OF THE INVENTION

Point clouds have been considered as a candidate format for transmission of 3D data, either captured by 3D scanners, LIDAR sensors, or used in popular applications such as Virtual Reality/Augmented Reality (VR/AR). Point Clouds are a set of points in 3D space. Besides the spatial position (X,Y,Z), each point usually has associated attributes, such as color (R,G,B) or even reflectance and temporal timestamps (e.g., in LIDAR images). In order to obtain a high fidelity representation of the target 3D objects, devices capture point clouds in the order of thousands or even millions of points. Moreover, for dynamic 3D scenes used in VR/AR application, every single frame often has a unique dense point cloud, which results in the transmission of several millions of point clouds per second. For a viable transmission of such a large amount of data, compression is often applied.

In 2017, MPEG issued a call for proposal (CfP) for compression of point clouds. After evaluation of several proposals, MPEG is considering two different technologies for point cloud compression: a) Video-based Point Cloud Compression (V-PCC), based on 3D to 2D projection technologies, followed by traditional video coding; and b) Geometry-based Point Cloud Compression (G-PCC), which used 3D native coding technologies like octree for geometry coding and 3D transforms for attribute coding.

MPEG identifies three distinct point cloud categories: (1) dynamically acquired point clouds, (2) static point clouds, and (3) dynamic point clouds. Two test models are proposed, the TMC2 for Category 2, which reflects the V-PCC paradigm, and the TMC13 for Categories 1 and 3, which reflects the G-PCC paradigm.

SUMMARY OF THE INVENTION

A quantization scheme substitutes the division operation by forward and inverse quantization look-up tables to improve efficiency.

In one aspect, a method programmed in a non-transitory memory of a device comprises receiving a quantization parameter, deriving a forward quantization step value using a forward look-up table and the quantization parameter and performing quantization on a value using the forward quantization step value to obtain a quantized value. The method of claim 1 further comprises deriving an inverse quantization step value using an inverse look-up table and the quantization parameter and performing dequantization on the quantized value to obtain a reconstructed value. Performing quantization on the value includes multiplying the value by the forward look-up table value and right shifting the result. The result is right shifted by s+M+N, where s is the greatest integer less than or equal to the quantization parameter divided by 6, and M and N are selected by a user. Performing dequantization on the quantized value includes multiplying the quantized value by the inverse look-up table value and left shifting the result. The result is left shifted by s, where s is the greatest integer less than or equal to the quantization parameter divided by 6. The device comprises a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player, a television, a home entertainment system, an augmented reality device, a virtual reality device, smart jewelry, or a vehicle.

In another aspect, an apparatus comprises a non-transitory memory for storing an application, the application for: receiving a quantization parameter, deriving a forward quantization step value using a forward look-up table and the quantization parameter and performing quantization on a value using the forward quantization step value to obtain a quantized value and a processor coupled to the memory, the processor configured for processing the application. The application is further for: deriving an inverse quantization step value using an inverse look-up table and the quantization parameter and performing dequantization on the quantized value to obtain a reconstructed value. Performing quantization on the value includes multiplying the value by the forward look-up table value and right shifting the result. The result is right shifted by s+M+N, where s is the greatest integer less than or equal to the quantization parameter divided by 6, and M and N are selected by a user. Performing dequantization on the quantized value includes multiplying the quantized value by the inverse look-up table value and left shifting the result. The result is left shifted by s, where s is the greatest integer less than or equal to the quantization parameter divided by 6. The apparatus comprises a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player, a television, a home entertainment system, an augmented reality device, a virtual reality device, smart jewelry, or a vehicle.

In another aspect, a system comprises an encoder configured for: receiving a quantization parameter, deriving a forward quantization step value using a forward look-up table and the quantization parameter and performing quantization on a value using the forward quantization step value to obtain a quantized value and a decoder configured for: deriving an inverse quantization step value using an inverse look-up table and the quantization parameter and performing dequantization on the quantized value to obtain a reconstructed value. Performing quantization on the value includes multiplying the value by the forward look-up table value and right shifting the result. The result is right shifted by s+M+N, where s is the greatest integer less than or equal to the quantization parameter divided by 6, and M and N are selected by a user. Performing dequantization on the quantized value includes multiplying the quantized value by the inverse look-up table value and left shifting the result. The result is left shifted by s, where s is the greatest integer less than or equal to the quantization parameter divided by 6. The encoder comprises a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player, a television, a home entertainment system, an augmented reality device, a virtual reality device, smart jewelry, or a vehicle.

DETAILED DESCRIPTION OF THE PREFERRED EMBODIMENT

A quantization scheme substitutes the division operation by forward and inverse quantization look-up tables to improve efficiency.

The Moving Picture Experts Group (MPEG) is currently defining the standard for Point Cloud Compression (PCC). Point clouds are used to represent three-dimensional scenes and objects, and are composed by volumetric elements (voxels) described by their geometrical or appearance properties. The TMC13 is a test model software maintained and distributed by the MPEG that constantly incorporates new proposals approved by their contributors. The standard's compression scheme based on geometry properties, called G-PCC, can perform attribute coding using a quantization framework and is also implemented in the TMC13 software. Quantization is the process by which a range of values is mapped to a single value, thus resulting in a lossy compression scheme. In the context of G-PCC, quantization reduces the dynamic range of transformed attribute coefficients.

Previously, quantization was done by a simple division. As described herein, the use of quantization tables for quantization and inverse quantization is implemented instead. Given a quantization parameter QP, a forward and an inverse quantization step are derived (ForQstep and InvQstep) based on two different quantization tables (forward (fLUT) and inverse (gLUT)). The input value is quantized using ForQStep and dequantized using InvQstep. The scheme allows for the removal of the division operation in the quantization process. With a same QP, if fLUT is utilized, a Forward Quantization step (ForQstep) is obtained, and if gLUT is used, an Inverse Quantization step (InvQstep) is obtained. In some embodiments, the same method is employed to obtain ForQstep and InvQstep, where the only difference is which table is used—fLUT or gLUT.

Figure 1:
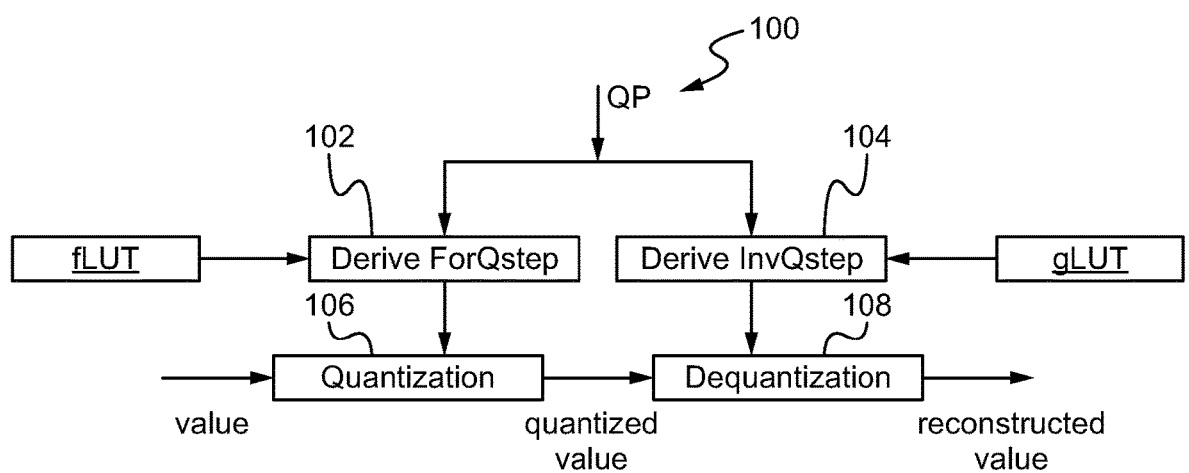
FIG. 1 illustrates a flowchart of a method of Region-Adaptive Hierarchical Transform (RAHT) and lifting quantization unification through the use of look-up tables according to some embodiments.

FIG. 1 illustrates a flowchart of a method of Region-Adaptive Hierarchical Transform (RAHT) and lifting quantization unification through the use of look-up tables according to some embodiments. In the step 100, a Quantization Parameter (QP) is received/selected. In the step 102, a forward Look-Up Table (fLUT) is used to derive the ForQstep, and in the step 104, an inverse Look-Up Table (gLUT) is used to derive the InvQstep. In the step 106, a value (e.g., coefficient) is quantized using the ForQstep resulting in a quantized value, and the quantized value is dequantized using the InvQstep in the step 108, which results in a reconstructed value. In some embodiments, fewer or additional steps are implemented. In some embodiments, the order of the steps is modified.

An exemplary implementation is described herein. Given QP values, let:

$gLUT=[161\ 181\ 203\ 228\ 256\ 287]$ $s=\lfloor QP/6 \rfloor$ and $Qs=gLUT[QP\%\ 6]\cdot 2^s$.

Then, in the old approach $$qCoef = \frac{coef}{Qs}.$$

However, this results in a loss of precision.

Instead, in the method described herein, let:

$$fLUT \cdot gLUT \approx 2^{M+N} \rightarrow fLUT = \frac{2^{M+N}}{gLUT}.$$

M and N are arbitrary values that a user (or a computing device using artificial intelligence) is able to select to adjust the precision. For example, in some implementations higher M and N values result in higher precision.

Then, the LUT-based formulation is defined as:

$qCoef=(coef \cdot fLUT)>>s+M+N$.

In other words, qCoef is equal to the coefficient times the fLUT value with that result shifted right by s+M+N.

Dequantization is achieved by, $coef'=qCoef \cdot gLUT<<s$.

In one example, N=8 and M=14, which would mean fLUT becomes:

$fLUT=[26052\ 23173\ 20662\ 18396\ 16384\ 14614]$.

In another example, for improved precision, M is able to be set to 18, and in this case fLUT becomes:

$fLUT=[41682\ 370767\ 330586\ 294337\ 262144\ 233829]$.

Figure 2:
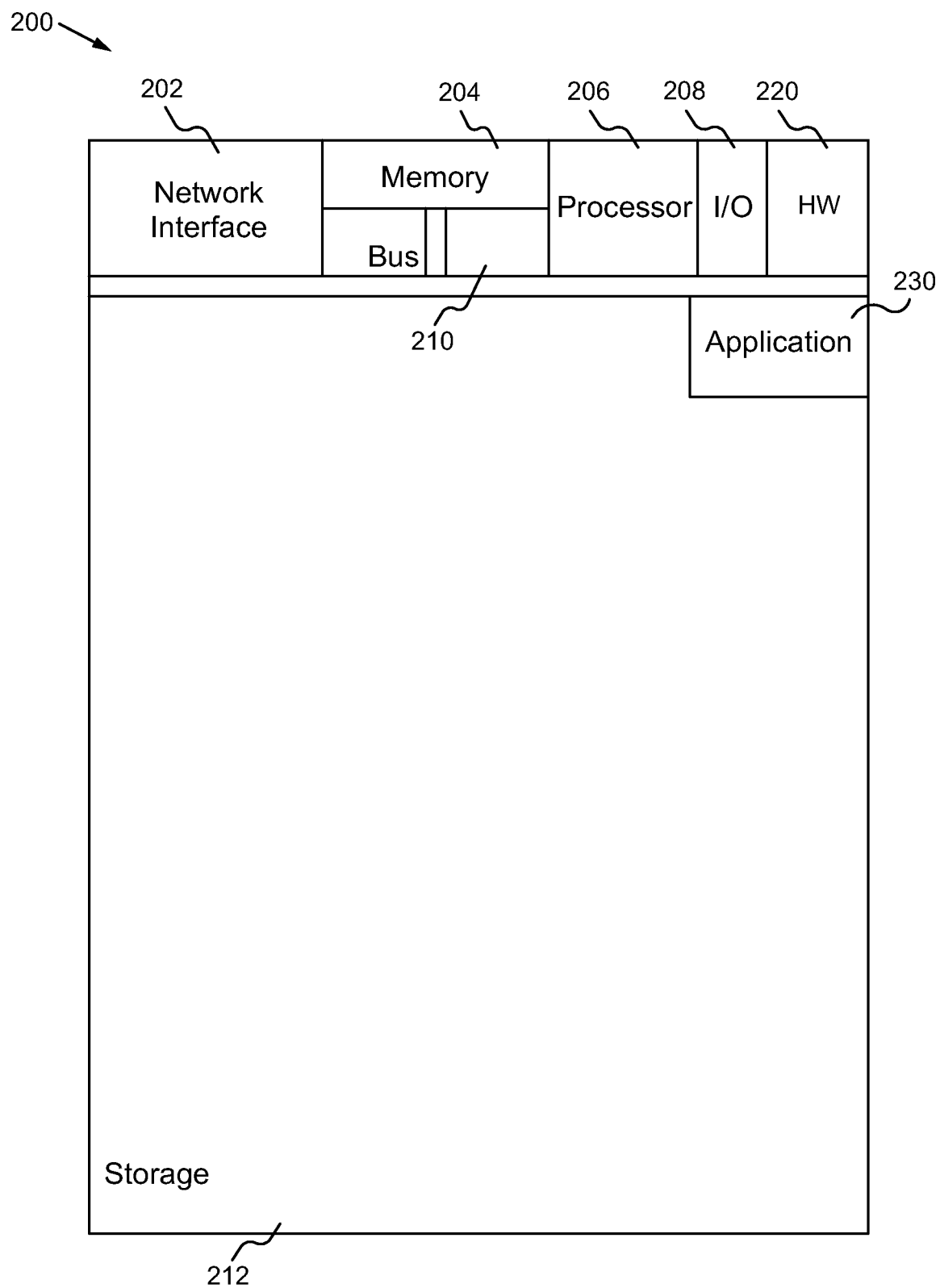
FIG. 2 illustrates a block diagram of an exemplary computing device configured to implement the look-up table quantization method according to some embodiments.

FIG. 2 illustrates a block diagram of an exemplary computing device configured to implement the look-up table quantization method according to some embodiments. The computing device 200 is able to be used to acquire, store, compute, process, communicate and/or display information such as images and videos including 3D content. The computing device 200 is able to implement any of the look-up table quantization aspects. In general, a hardware structure suitable for implementing the computing device 200 includes a network interface 202, a memory 204, a processor 206, I/O device(s) 208, a bus 210 and a storage device 212. The choice of processor is not critical as long as a suitable processor with sufficient speed is chosen. The memory 204 is able to be any conventional computer memory known in the art. The storage device 212 is able to include a hard drive, CDROM, CDRW, DVD, DVDRW, High Definition disc/drive, ultra-HD drive, flash memory card or any other storage device. The computing device 200 is able to include one or more network interfaces 202. An example of a network interface includes a network card connected to an Ethernet or other type of LAN. The I/O device(s) 208 are able to include one or more of the following: keyboard, mouse, monitor, screen, printer, modem, touchscreen, button interface and other devices. Look-up table quantization application(s) 230 used to implement the look-up table quantization method are likely to be stored in the storage device 212 and memory 204 and processed as applications are typically processed. More or fewer components shown in FIG. 2 are able to be included in the computing device 200. In some embodiments, look-up table quantization hardware 220 is included. Although the computing device 200 in FIG. 2 includes applications 230 and hardware 220 for the look-up table quantization method, the look-up table quantization method is able to be implemented on a computing device in hardware, firmware, software or any combination thereof. For example, in some embodiments, the look-up table quantization applications 230 are programmed in a memory and executed using a processor. In another example, in some embodiments, the look-up table quantization hardware 220 is programmed hardware logic including gates specifically designed to implement the look-up table quantization method.

In some embodiments, the look-up table quantization application(s) 230 include several applications and/or modules. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch), a vehicle (e.g., a self-driving vehicle) or any other suitable computing device.

Figure 3:
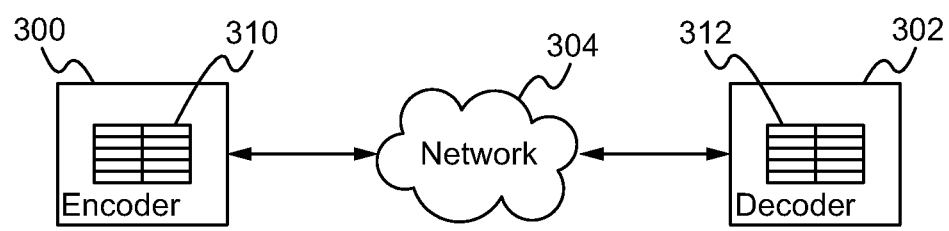
FIG. 3 illustrates a diagram of an exemplary encoder and decoder configuration according to some embodiments.

FIG. 3 illustrates a diagram of an exemplary encoder and decoder configuration according to some embodiments. An encoder device 300 includes a look-up table 310 for quantization, and a decoder device 302 includes a look-up table 312 for inverse quantization. The encoder device 300 and the decoder device 302 are able to communicate directly or over a network 304 (e.g., the Internet, cellular network, local area network) as shown. For example, the encoder device 300 performs quantization as described herein to generate a quantized value which is sent to the decoder device 302 which performs dequantization to generate the reconstructed value. The encoder device 300 and the decoder device 302 are able to be part of any computing device described herein. Although FIG. 3 shows the encoder on a first device and a decoder on a second device, in some implementations the encoder and decoder are on the same device. For example, both devices have both an encoder and a decoder (e.g., a codec).

To utilize the look-up table quantization method, a device acquires or receives 3D content and processes and/or sends the content in an optimized manner to enable proper, efficient display of the 3D content. The look-up table quantization method is able to be implemented with user assistance or automatically without user involvement.

In operation, the look-up table quantization method improves efficiency by utilizing look-up tables instead of division. The method described herein is able to be utilized with a geometry-based encoder or another encoder. The method described herein is able to be used by RAHT and Lifting. Results show that the method described herein leads to comparable or better performance when compared to the current implementation of the G-PCC.

Some Embodiments of Forward and Inverse Quantization for Point Cloud Compression Using Look-Up Tables 1. A method programmed in a non-transitory memory of a device comprising:
   receiving a quantization parameter;
   deriving a forward quantization step value using a forward look-up table and the quantization parameter; and
   performing quantization on a value using the forward quantization step value to obtain a quantized value.
2. The method of clause 1 further comprising:
   deriving an inverse quantization step value using an inverse look-up table and the quantization parameter; and
   performing dequantization on the quantized value to obtain a reconstructed value.
3. The method of clause 2 wherein performing quantization on the value includes multiplying the value by the forward look-up table value and right shifting the result.
4. The method of clause 3 wherein the result is right shifted by s+M+N, where s is the greatest integer less than or equal to the quantization parameter divided by 6, and M and N are selected by a user.
5. The method of clause 2 wherein performing dequantization on the quantized value includes multiplying the quantized value by the inverse look-up table value and left shifting the result.
6. The method of clause 5 wherein the result is left shifted by s, where s is the greatest integer less than or equal to the quantization parameter divided by 6.
7. The method of clause 1 wherein the device comprises a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player, a television, a home entertainment system, an augmented reality device, a virtual reality device, smart jewelry, or a vehicle.
8. An apparatus comprising:
   a non-transitory memory for storing an application, the application for:
      receiving a quantization parameter;
      deriving a forward quantization step value using a forward look-up table and the quantization parameter; and
      performing quantization on a value using the forward quantization step value to obtain a quantized value; and
   a processor coupled to the memory, the processor configured for processing the application.
9. The apparatus of clause 8 wherein the application is further for:
   deriving an inverse quantization step value using an inverse look-up table and the quantization parameter; and
   performing dequantization on the quantized value to obtain a reconstructed value.
10. The apparatus of clause 9 wherein performing quantization on the value includes multiplying the value by the forward look-up table value and right shifting the result.

11. The apparatus of clause 10 wherein the result is right shifted by s+M+N, where s is the greatest integer less than or equal to the quantization parameter divided by 6, and M and N are selected by a user.
12. The apparatus of clause 9 wherein performing dequantization on the quantized value includes multiplying the quantized value by the inverse look-up table value and left shifting the result.
13. The apparatus of clause 12 wherein the result is left shifted by s, where s is the greatest integer less than or equal to the quantization parameter divided by 6.
14. The apparatus of clause 9 wherein the apparatus comprises a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player, a television, a home entertainment system, an augmented reality device, a virtual reality device, smart jewelry, or a vehicle.
15. A system comprising:
    an encoder configured for:
    receiving a quantization parameter;
    deriving a forward quantization step value using a forward look-up table and the quantization parameter; and
    performing quantization on a value using the forward quantization step value to obtain a quantized value; and
    a decoder configured for:
    deriving an inverse quantization step value using an inverse look-up table and the quantization parameter; and
    performing dequantization on the quantized value to obtain a reconstructed value.
16. The system of clause 15 wherein performing quantization on the value includes multiplying the value by the forward look-up table value and right shifting the result.
17. The system of clause 16 wherein the result is right shifted by s+M+N, where s is the greatest integer less than or equal to the quantization parameter divided by 6, and M and N are selected by a user.
18. The system of clause 15 wherein performing dequantization on the quantized value includes multiplying the quantized value by the inverse look-up table value and left shifting the result.
19. The system of clause 18 wherein the result is left shifted by s, where s is the greatest integer less than or equal to the quantization parameter divided by 6.
20. The system of clause 15 wherein the encoder comprises a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player, a television, a home entertainment system, an augmented reality device, a virtual reality device, smart jewelry, or a vehicle.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method programmed in a non-transitory memory of a device comprising:
   receiving a quantization parameter;
   deriving a forward quantization step value using a forward look-up table and the quantization parameter; and
   performing quantization on a value using the forward quantization step value to obtain a quantized value, wherein performing quantization on the value includes multiplying the value by the forward look-up table value and right shifting the result, wherein the result is right shifted by s+M+N, where s is the greatest integer less than or equal to the quantization parameter divided by 6, and M and N are selected by a user, wherein higher M and N values are selected for higher precision in the quantization.
2. The method of claim 1 further comprising:
   deriving an inverse quantization step value using an inverse look-up table and the quantization parameter; and
   performing dequantization on the quantized value to obtain a reconstructed value.
3. The method of claim 2 wherein performing dequantization on the quantized value includes multiplying the quantized value by the inverse look-up table value and left shifting the result.
4. The method of claim 3 wherein the result is left shifted by s, where s is the greatest integer less than or equal to the quantization parameter divided by 6.
5. The method of claim 1 wherein the device comprises a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player, a television, a home entertainment system, an augmented reality device, a virtual reality device, smart jewelry, or a vehicle.
6. An apparatus comprising:
   a non-transitory memory for storing an application, the application for:
   receiving a quantization parameter;
   deriving a forward quantization step value using a forward look-up table and the quantization parameter; and
   performing quantization on a value using the forward quantization step value to obtain a quantized value, wherein performing quantization on the value includes multiplying the value by the forward look-up table value and right shifting the result, wherein the result is right shifted by s+M+N, where s is the greatest integer less than or equal to the quantization parameter divided by 6, and M and N are selected by a user, wherein higher M and N values are selected for higher precision in the quantization; and
   a processor coupled to the memory, the processor configured for processing the application.
7. The apparatus of claim 6 wherein the application is further for:
   deriving an inverse quantization step value using an inverse look-up table and the quantization parameter; and performing dequantization on the quantized value to obtain a reconstructed value.

8. The apparatus of claim 7 wherein performing dequantization on the quantized value includes multiplying the quantized value by the inverse look-up table value and left shifting the result.

9. The apparatus of claim 8 wherein the result is left shifted by s, where s is the greatest integer less than or equal to the quantization parameter divided by 6.

10. The apparatus of claim 7 wherein the apparatus comprises a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player, a television, a home entertainment system, an augmented reality device, a virtual reality device, smart jewelry, or a vehicle.

11. A system comprising:
an encoder configured for:
receiving a quantization parameter;
deriving a forward quantization step value using a forward look-up table and the quantization parameter; and
performing quantization on a value using the forward quantization step value to obtain a quantized value, wherein performing quantization on the value includes multiplying the value by the forward look-up table value and right shifting the result, wherein the result is right shifted by s+M+N, where s is the greatest integer less than or equal to the quantization parameter divided by 6, and M and N are selected by a user, wherein higher M and N values are selected for higher precision in the quantization; and
a decoder configured for:
deriving an inverse quantization step value using an inverse look-up table and the quantization parameter; and
performing dequantization on the quantized value to obtain a reconstructed value.

12. The system of claim 11 wherein performing dequantization on the quantized value includes multiplying the quantized value by the inverse look-up table value and left shifting the result.

13. The system of claim 12 wherein the result is left shifted by s, where s is the greatest integer less than or equal to the quantization parameter divided by 6.

14. The system of claim 11 wherein the encoder comprises a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player, a television, a home entertainment system, an augmented reality device, a virtual reality device, smart jewelry, or a vehicle.

* * * * *